United States Patent [19]

Vega

[11] Patent Number: 5,082,120
[45] Date of Patent: Jan. 21, 1992

[54] FREE STANDING BIKE RACK

[76] Inventor: James S. Vega, 109 Granada Ave., #C, Long Beach, Calif. 90803

[21] Appl. No.: 193,798

[22] Filed: May 13, 1988

[51] Int. Cl.⁵ .............................................. B60P 3/06
[52] U.S. Cl. .................................... 211/20; 211/17; 211/189
[58] Field of Search ............... 211/20, 22, 17, 24, 211/23, 189, 21, 41

[56] References Cited

U.S. PATENT DOCUMENTS

| | | | |
|---|---|---|---|
| 511,367 | 12/1893 | Slater | 211/20 X |
| 1,361,112 | 12/1920 | Stern | 211/24 X |
| 1,540,641 | 6/1925 | Lockhart | 211/189 X |
| 3,901,421 | 8/1975 | Kalicki et al. | 211/20 X |
| 4,108,316 | 8/1978 | Slater | 211/189 |
| 4,632,344 | 12/1986 | Lang et al. | 211/189 X |

FOREIGN PATENT DOCUMENTS 2331 of 1904 United Kingdom .................. 211/20

OTHER PUBLICATIONS

Beautifully Simple, Simply Beautiful by Rungs Bicycle Storage Systems mailed Jan. 22, 1988.
Finally A Storage System with Style by PedaStyle Bicycle Storage Systems of Wichita, KS 67216 manufactured by IMS Enterprises, Wichita, KS 67216.
Indoor Bicycle Rack published in the Mar. 1988 issue of Bicycling at p. 32 under New Products by Fred Zahradnik.
Classy Hangout by IMS Enterprises of Wichita, KS published under Velomart in Cyclist at p. 32.
Rack-Up 1 by Pamir Engineering of Boylston, MA 01505 published under Cyclist Marketplace in Cyclist, Apr. 1988, p. 84.
Promotional flyer entitled Rack-Up and Rack-Up 1 Mounting Instructions dated Jan., 1988 received from Pamir Engineering on Mar. 25, 1988.
Store It! by Rungs, Inc. published in Cyclist Marketplace.
Advertisement for 2 Up Wall Bike Rack by 2 Up of Houston, TX 77042 published at p. 223 in the Mar. edition of Bicycling and p. 86, Apr. 1988 issue of Cyclist.
Hang it up! by Bib Mama Sporting Goods of Katy, TX 77449 published at p. 16 in the Feb./Mar. 1988 edition of Mountain Biking.
Hanging Around by Butler Enterprises of San Diego, CA published by Velomart in the Oct. 1987 issue of Cyclist.
Storing and Tuneup Rack by Butler Enterprises of San Diego, CA Promotional Flyer for Big Mama, Big Mama II and Little Brother Bike Racks by Big Mama Sporting Goods, Inc. of Houston, Tx received 3/3/88.

*Primary Examiner*—Alvin C. Chin-Shue
*Attorney, Agent, or Firm*—Charles H. Thomas

[57] ABSTRACT

A bicycle rack is constructed of steel and includes a base formed by a pair of parallel rails laterally spaced from each other and joined by a laterally extending connecting link. A pair of elongated stanchions extends upwardly from the rails to converge together at an apex which is at a height greater than the length of a bicycle. The upper extremities of the stanchions are joined together by gusset plates and either one or two hooks extend transversely outwardly from the gusset plates vertically above the base. A bicycle is suspended from one or both of the hooks by one of its wheels, so that the wheels of the bicycle are disposed one above another with the weight of the bicycle acting downwardly vertically above the base.

7 Claims, 3 Drawing Sheets

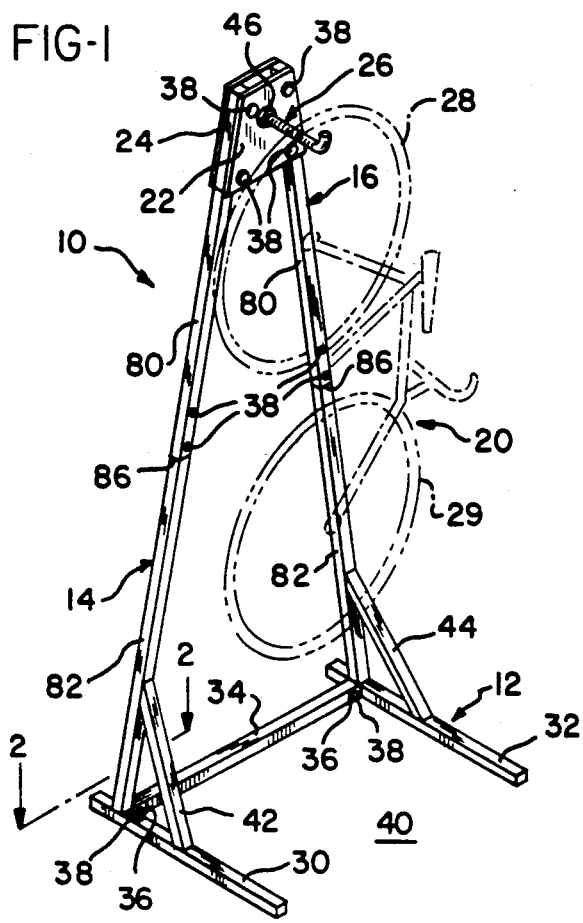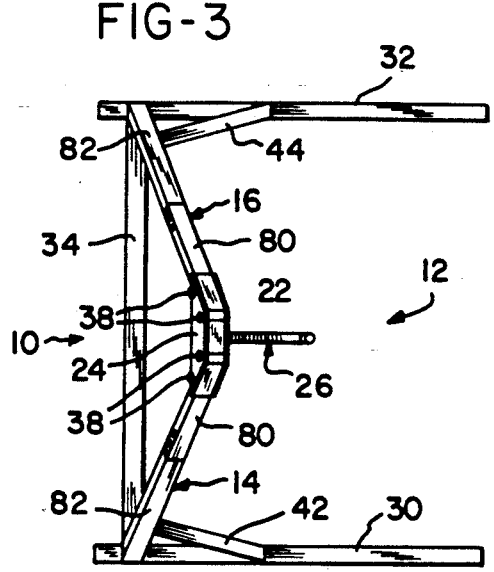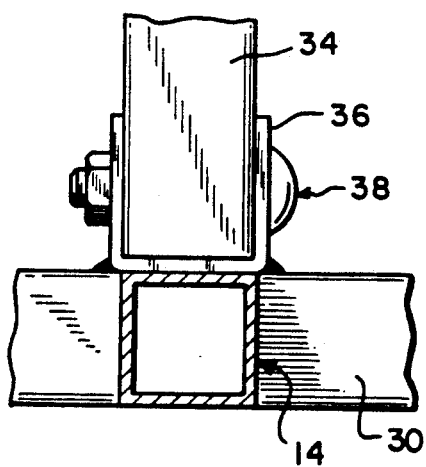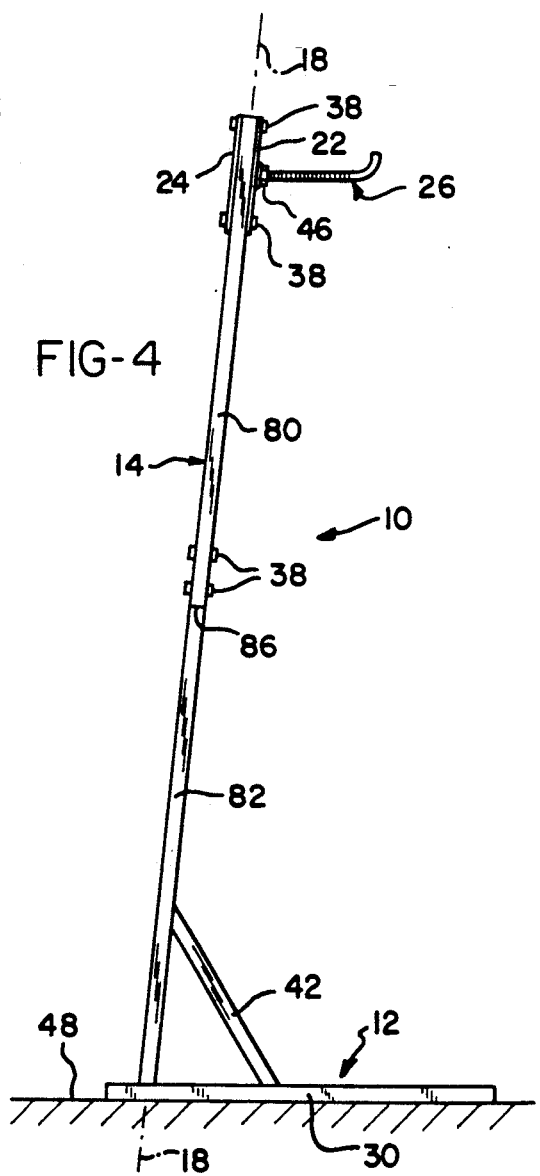

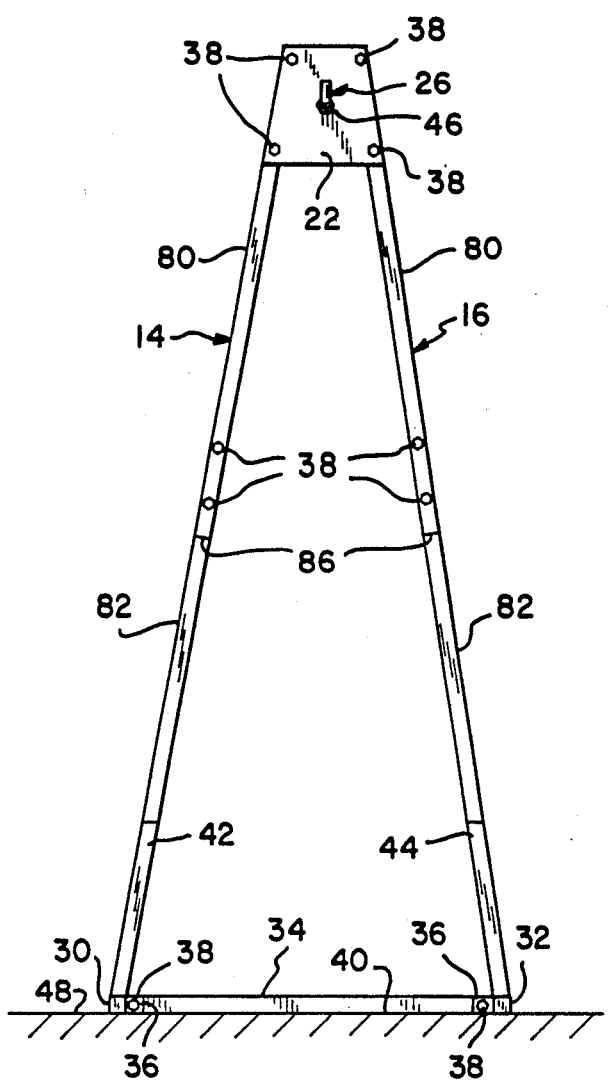

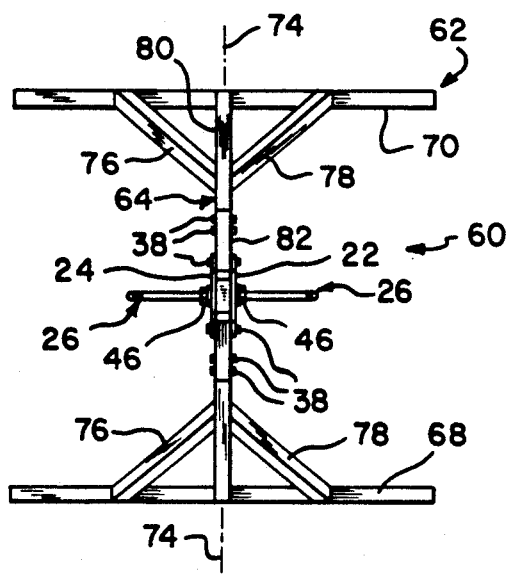
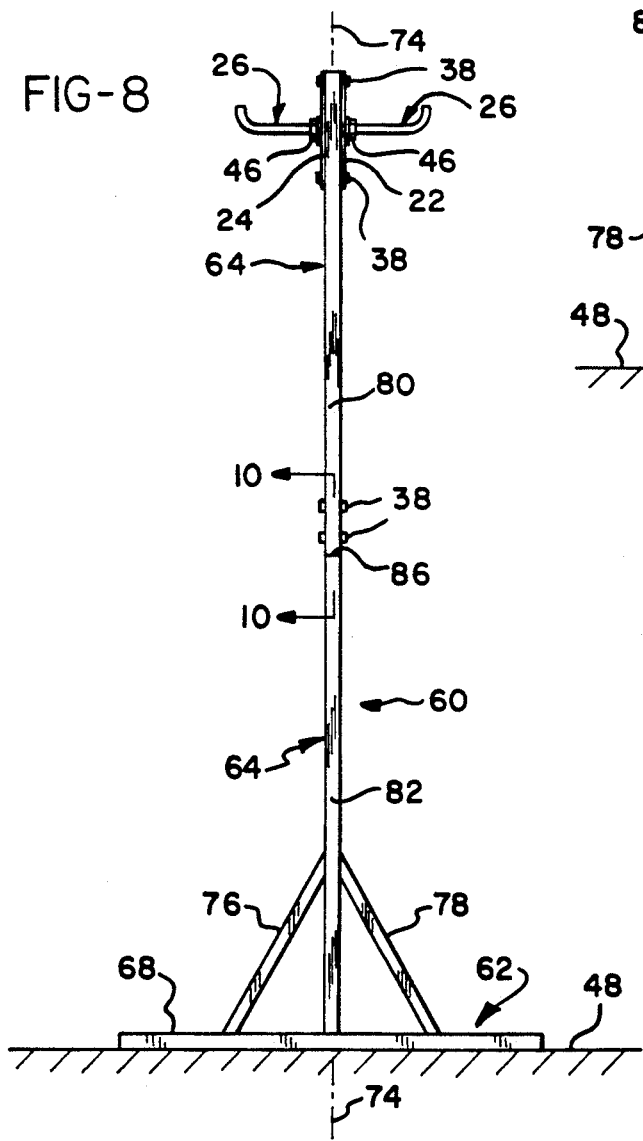
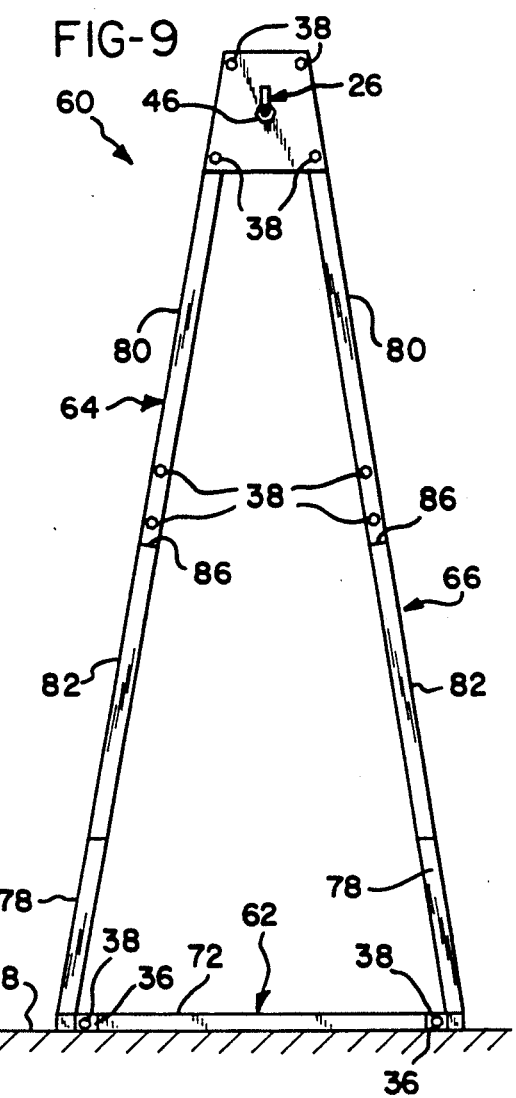

FREE STANDING BIKE RACK

BACKGROUND OF THE INVENTION

1. Field of the Invention

The present invention relates to a freestanding rack for suspending a bicycle above a supporting surface.

2. Description of the Prior Art

A number of different types of bicycle racks have been devised for the purpose of storing bicycles which are not in use. Most conventional bicycle racks are wall or ceiling mounted devices which are permanently secured in place within a building structure. Bicycle racks designed for residential storage of bicycles are often formed of wood and include brackets or wheel slots having specific dimensions and disposed in predetermined spatial separation from each other to accommodate particular models of bicycles.

Conventional bicycle racks designed for home use must be bolted or otherwise secured to a wall or otherwise held against some supporting structure. As a consequence, defacement of the wall is necessary in order to install such conventional racks, and such racks become permanent fixtures. Furthermore, because conventional bicycle racks designed for residential bicycle storage are often constructed of wood, they readily deteriorate if located in areas subject to inclement weather, such as near garage doors, or patios beneath overhanging roofs and in open courtyards.

SUMMARY OF THE INVENTION

It is an object of the present invention to provide a freestanding bicycle rack which is able to support a bicycle and which occupies a minimum of floor space. Unlike conventional bicycle racks designed for home use, the bicycle rack of the invention is designed to support a bike by means of an elevated hook which cradles one wheel of the bicycle. The bicycle is thereby hung from a hook with one wheel disposed vertically beneath the other and with the longitudinal axis of the bicycle residing in a generally vertical orientation. Because the bicycle is suspended lengthwise from above by means of a single hook, a bicycle can be stored within a very small amount of floor space.

A further object of the invention is to provide a freestanding bicycle rack which will readily accommodate all different types, styles and models of bicycles. Because a bicycle is suspended from a single hook which extends beneath the wheel spokes and supports the rim of either the front or rear wheel, the bicycle rack of the invention may be utilized to support bicycles of widely varying sizes and configurations. For example, a rack according to the invention can easily support mountain-type bicycles, cruiser-type bicycles, motorcross bicycles, and all other styles of bicycles having different wheel size and frame configurations By suspending a bicycle from a single wheel, the invention avoids the problems of prior bicycle racks which require brackets to be spaced at specific intervals so as to accommodate frame members of particular sizes and configurations that are characteristic of specific models of bicycles. The freestanding bicycle rack of the present invention is universal in the sense that it can support bicycles of all different wheel sizes, frame configurations and handlebar styles as long as the bicycle employs spoked wheels.

The unique construction of the bicycle rack of the invention also avoids the problems of balancing a bicycle on laterally spaced brackets. The only point of contact between the bicycle and the rack is a small area on the inside of either the front or the rear rim. The bicycle rack of the invention can support a bicycle by either wheel, and a bicycle suspended in this manner will seek its own orientation above the base of the bicycle rack, depending upon the location of the center of gravity. Thus, the bicycle is self balancing on the rack and the problems of properly balancing a bicycle, which are so characteristic of prior devices, are avoided.

A further object of the invention is to provide a bicycle rack which is freestanding and which requires no connection whatsoever to walls, a floor or a ceiling. The bicycle rack of the invention is light in weight and can therefore be moved about as desired by the owner. The invention is extremely useful for storing bicycles in small apartments and living areas since it requires no attachment to any wall or ceiling and can be moved out of sight when desired.

One embodiment of the bicycle rack of the invention is designed to support a single bicycle. In this embodiment a pair of stanchions extend upwardly from locations laterally displaced from the center of the base at an inclination toward the center of the base. The stanchions are inclined toward each other and are coupled together at an apex. A single hook extends out over the center of the base from the junction of the upper extremities of the stanchions. A single bicycle may be suspended by either the front or rear wheel from the hook and hangs downwardly with the center of its weight laterally offset only very slightly, if at all, from the center of the base of the rack.

In an alternative embodiment a pair of upright stanchions reside in a vertical plane which passes through the center of the base. The stanchions converge toward each other above the base and are joined by some form of coupling means, such as a pair of gusset plates. A pair of hooks extend outwardly from the plane of the stanchions and in opposite directions therefrom. A bicycle rack so constructed can support a bicycle from each of the two opposing hooks, although the rack may also be utilized to support a single bicycle from a single one of the hooks as well.

The freestanding bicycle rack of the invention may be readily assembled and disassembled when desired. Preferably, the stanchions of the rack are formed of upper and lower tubular steel sections of uniform cross section. The tubular sections receive a connecting post therewithin at their mutual interface. The connecting post is preferably welded to one of the stanchion sections and is releasably connected to the other, as for example, by bolts and nuts.

The base of the invention may otherwise be formed of separable components. Preferably, the base of the rack is comprised of a pair of mutually parallel, horizontally disposed steel rails which are spaced in longitudinal separation from each other. A longitudinally extending member is releasably secured to both of the rails and may be embraced between and bolted within the arms of U-shaped brackets extending laterally outwardly from the rails.

All of the structural members of the freestanding bicycle rack of the invention are fabricated of lightweight metal. The base and the stanchions are formed of tubular steel members while the gusset plates which join the upper extremities of the stanchions may be aluminum plates one eighth of an inch in thickness. The hooks which extend outwardly from the gusset plates are preferably steel also, but are normally covered with a non metallic protective coating, such as vinyl plastic, to avoid scratching the metal wheel rim of a bicycle suspended therefrom.

In one broad aspect the present invention is a freestanding bicycle rack comprising a base for resting on a supporting surface, a pair of stanchions mounted on the base and rising thereabove to a height greater than the bicycle, coupling means joining the stanchions together at their upper extremities, and hook means extending laterally outwardly from the stanchions and above the base to hold a bicycle placed thereon in suspension above the supporting surface and over the base.

In another aspect the present invention may be considered to be a freestanding rack for suspending a bicycle comprising a base including laterally separated feet for placement on a mounting surface, a gantry secured to the base and rising thereabove to an apex located vertically above the base and between the feet, and hook means extending laterally outwardly from the gantry proximate to the apex for holding at least one bicycle by one wheel thereof such that the bicycle is suspended from the hook means with the wheels thereof disposed one above the other with the weight of the bicycle acting vertically above the base.

The invention may be described with greater clarity and particularity with reference to the accompanying drawings.

DESCRIPTION OF THE DRAWINGS

FIG. 1 is a perspective view of a first embodiment of a freestanding bicycle rack according to the invention with a bicycle suspended therefrom shown in phantom lines.

FIG. 2 is a sectional detail taken where indicated at 2 in FIG. 1.

FIG. 3 is a top plan view of the bicycle rack of FIG. 1.

FIG. 4 is a side elevational view of the bicycle rack of FIG. 1

FIG. 5 is a front elevational view of the bicycle rack of FIG. 1.

FIG. 6 is a perspective view of an alternative embodiment of the bicycle rack according to the invention, with a pair of bicycles suspended therefrom shown in phantom lines.

FIG. 7 is a top plan view of the bicycle rack of FIG. 6.

FIG. 8 is a side elevational view of the bicycle rack of FIG. 6.

FIG. 9 is a front elevational view of the bicycle rack of FIG. 6.

FIG. 10 is a longitudinal sectional detail taken along the lines 10—10 of FIG. 8.

DESCRIPTION OF THE EMBODIMENTS

FIG. 1 illustrates a freestanding bicycle rack 10 comprising a base 12 and a pair of stanchions 14 and 16 rigidly secured to the base 12, as by welding, and rising therefrom and converging toward each other to define a plane, indicated at 18 in FIG. 4. The stanchions 14 and 16 extend to a height greater than the length of a bicycle which is indicated in phantom lines at 20. Coupling means in the form of a pair of gusset plates 22 and 24 rigidly secure the stanchions 14 and 16 to each other at their upper extremities. A hook means, in the form of a single vinyl coated hook 26, extends transversely outwardly between the stanchions 14 and 16 at an angle relative to the plane 18 defined by the stanchions 14 and 16 to engage a wheel 28 of the bicycle 20. The hook 26 holds the bicycle 20 suspended by the rear wheel 28 above the base 12 as illustrated in FIG. 1.

The base 12 is comprised of a pair of laterally separated, mutually parallel rails 30 and 32 which serve as supporting feet and which are joined to each other by means of a linear, laterally extending connecting member 34. The connecting member 34 is releasably secured t both of the rails 30 and 32 by means of U-shaped brackets 36 and bolt and nut assemblies 38 in the manner best depicted in FIG. 2.

Both the rails 30 and 32 are formed of hollow, square one inch tubular steel members approximately two feet in length and plugged at both ends. The connecting member 34 is likewise formed of one inch square tubular steel and is approximately thirty inches in length. The U-shaped steel brackets are welded to the facing sides of the rails 30 and 32 and are centered approximately two and three quarter inches from the rear ends of the rails 30 and 32. The U-shaped steel brackets 36 on the rails 30 and 32 embrace the connecting member 34 on its opposite ends, as depicted in FIGS. 1 and 2. The shanks of the bolt assemblies 38 pass through aligned apertures in the outwardly extending arms of the U-shaped brackets 36 and through corresponding apertures in the walls of the connecting member 34.

The stanchions 14 and 16 are likewise formed of one inch square steel tubing and ar each about seventy seven inches in overall length. The stanchions 14 and 16 are respectively welded to the top surfaces of the rails 30 and 32 and extend upwardly and converge toward each other. The stanchions 14 and 16 lie at an angle of approximately twenty degrees relative to each other in the plane 18. The plane 18 resides at an angle of about eighty five degrees relative to the horizontal and the plane of the base 12. Stanchions of this size and orientation in this manner will suspend even a large bicycle, such as a thirty inch bicycle, above the base 20 and elevated above the supporting surface 48.

Together the stanchions 14 and 16 form a gantry and culminate in an apex where the upper extremities are coupled together by the trapezoidal shaped gusset plates 22 and 24. The plane 18 defined by the stanchions 14 and 16 is inclined upwardly and toward the center 40 of the base 12. The center 40 of the base 12 lies between the rails 30 and 32 and forward of the connecting member 34 as illustrated in FIGS. 1 and 3.

The stanchions 14 and 16 are rigidly connected to the base 12 by welding to the upper surface of the rails 30 and 32, respectively, at locations laterally displaced from the center 40 of the base 12. The stanchions 14 and 16 extend upwardly at an inclination toward the center of the base 12 and are held at the desired angle of inclination by rearwardly inclined braces 42 and 44, respectively. The braces 42 and 44 are respectively welded to the upper surfaces of the rails 30 and 32 and the forward surfaces of the stanchions 14 and 16. The braces 42 and 44 hold the stanchions 14 and 16 rigidly inclined relative to the base 12. The upper extremities of the stanchions 14 and 16 are held in rigid disposition relative to each other at the apex of the gantry by means of bolt assemblies 38, the shank of which extend through apertures in the gusset plates 22 and 24 and through corresponding apertures in the upper extremities of the stanchions 14 and 16.

A single hook 26 is provided for the freestanding bicycle rack 10. The hook 26 is constructed as a steel rod which is threaded on one end and which is bent into a crook at its opposite end. Except at its threaded tip, the hook 26 is completely coated with a polyvinyl chloride plastic so that the wheel 28 of the bicycle does not make contact with any metal surface. A bearing nut 46 is threadably engaged on the threaded tip of the hook 26 and resides in abutment with the forwardly facing surface of the gusset plate 22. The hook 26 is firmly held in position protruding outwardly at an angle relative to the plane 18 by another nut which is engaged on the threaded tip of the hook 26 and which bears against the back surface of the gusset plate 22. The single hook 26 extends from the coupling gusset plate 22 out over the center 40 of the base and vertically thereabove.

The bicycle rack 10 rests on a supporting surface 48, as depicted in FIGS. 4 and 5. Because the bicycle rack 10 is a freestanding structure, it may be moved to any location as desired. The freestanding bicycle rack 10 provides a means for storing a single bicycle 20 within a floor space of very small area. The bicycle rack 10 avoids the problem of balancing and bracket misalignment which are characteristic of conventional bicycle racks. Furthermore, the bicycle rack 10 requires no attachment or contact with any wall or ceiling and merely rests upon the supporting surface 48 so that it may be moved at will.

To utilize the freestanding bicycle rack 10, a bicycle 20 is turned from its normal disposition with both wheels on the supporting surface 48 so that either the front wheel 29 or the rear wheel 28 is lifted in the air. The bicycle 20 is then lifted and the uppermost portion of the rim 28 is pushed onto the hook 26 so as to clear the crook a the cantilevered extremity of the hook 26. The bicycle 20 then hangs downwardly suspended from the hook 26 with the rear wheel 28 disposed vertically above the front wheel 29. Since the bicycle 20 contacts the bicycle rack 10 only at a single location on the hook 26, the bicycle 20 will orient itself so that its center of gravity will resides in vertical alignment with the hook 26. The height of the freestanding bicycle rack 10 is such that the front wheel 29 extends to within about six to ten inches of the supporting surface 48 and in near vertical alignment with the center 40 of the base 12.

To remove the bicycle 20 from the bicycle rack 10, the user merely lifts the frame of the bicycle rack 10 slightly so that the rim of the wheel 28 will clear the crook on the tip of the hook 26. The user then pulls the bicycle 20 off of the hook 26 and lowers it to the supporting surface 48. The plastic coating on the hook 26 protects the finish of the bicycle 20 from being marred.

FIGS. 6 through 9 illustrate an alternative embodiment of the invention. The bicycle rack 60 of FIG. 6-9, like the bicycle rack 10, is freestanding. The bicycle rack 60 is comprised of a base 62 configured in the shape of an "H" for resting on a supporting surface 48. A pair of stanchions 64 and 66 are mounted on the base 62 and rise thereabove to a height greater than the length of the bicycles 20 illustrated in phantom in FIG. 6. Coupling means, in the form of gusset plates 22 and 24, join the stanchions 64 and 66 together at their upper extremities. Hook means, in the form of a pair of hooks 26, extend laterally outwardly from the stanchions 64 and 66 above the base 62 and in opposite directions from each other. Each of the hooks 26 holds a separate bicycle 20 placed thereon in suspension above the supporting surface 48 and over the base 62.

The base 62 is comprised of a pair of parallel rails 68 and 70 which are both formed of square one inch steel tubing about thirty four inches in length. The rails 68 and 70 serve as feet for the freestanding bicycle rack 60 and are laterally spaced from each other. The rails 68 and 70 are joined together by a laterally disposed connecting member 72, which is likewise formed of one inch square steel tubing and is about thirty inches in length. The rails 68 and 70 are joined to the connecting member 72 by means of U-shaped brackets 36 and bolt assemblies 38 in the same manner as depicted in FIGS. 1 and 2 with reference to the bicycle rack 10.

The stanchions 64 and 66 rise from the base 62 and converge toward each other in a vertical plane indicated at 74 in FIGS. 7 and 8. The stanchions 64 and 66 reside at an angle of about twenty degrees relative to each other in the plane 74 and are likewise each about six feet five inches in length. The stanchions 64 and 66 are welded to the centers of the rails 68 and 70, respectively.

The bicycle rack 60 is also provided with pairs of fore and aft braces 76 and 78. The braces 76 and 78 in each pair are respectively welded to the associated stanchion and rail of the base between which they extend. The braces 76 and 78 serve to stabilize the stanchions 64 and 66 and hold them rigidly in the plane 74.

As best illustrated in FIGS. 7 and 8, two separate hooks 26 extend laterally outwardly in opposite directions from the vertical plane 74. The threaded shanks of the hooks 26 are perpendicular to the vertical plane 74. One of the hooks 26 is rigidly locked by nuts which bear against the opposite surfaces of the gusset plate 22, while the other hook 26 is similarly locked by threaded nuts to the gusset plate 24.

As illustrated in FIG. 6, the freestanding bicycle rack 60 is adapted to hold either one or two different bicycles 20. A single bicycle is suspended from each of the hooks 26 in the manner described in connection with the bicycle rack 10.

All of the embodiments of the bicycle rack of the invention may be readily disassembled to occupy a very small volume for purposes of storage and shipping. The hooks 26 and the gusset plates 22 and 24 may be removed by threadably disengaging the fasteners associated therewith. Likewise, the connecting members in the bicycle rack bases are releasably joined to the rails, and may be separated therefrom by removal of the bolt assemblies 38.

A further important feature of the invention is that the stanchions of the bicycle rack ma likewise be disassembled. FIG. 10 is a sectional detail of the central portion of the stanchion 64, but the structural details of FIG. 10 are applicable to all of the stanchions of all of the embodiments of the invention illustrated. As shown in the drawings the stanchions 14, 16, 64 and 66 are each comprised of an upper section 80 and a lower section 82 formed of one inch square hollow tubular steel. The upper and lower stanchion sections 80 and 82 are of uniform cross sectional configuration.

Each of the stanchions, such as the stanchion 64, further includes a hollow square tubular steel insert post 84 which fits snugly and telescopically within both the upper section 80 and the lower section 82 where the upper and lower sections meet at an interface 86 therebetween. The connecting post 84 is plug welded at two locations indicated at 88 within a first of the two stanchion sections, which is the lower stanchion section 82 in the embodiments illustrated.

Welding is performed with an acetylene torch and a flux welding technique is preferably employed. That is, flux is introduced into several opposing access apertures on opposite sides of the lower section 82 near the interface 88 once the connecting post 84 has been inserted into position as depicted in FIG. 10. The flux flows along the outer surface of the connecting post 84 adjacent the apertures and hardens to form rigid welded connections between the outer surface of the connecting post 84 and the facing interior surfaces 90 of the lower stanchion section 82 adjacent the access apertures. The access apertures are thereafter filled with plugs 92 of auto body putty or some other filling compound, for aesthetic purposes. The connecting posts 84 are thereupon permanently joined as center extensions to the lower stanchion sections 82.

To assemble the stanchions, the connecting post 84 of each lower stanchion section 82 is inserted telescopically into the corresponding upper stanchion section 80. The upper and lower stanchion sections 80 and 82 are thereupon releasably secured together by means of bolt assemblies 38. The shanks of the bolt assemblies 38 pass through aligned apertures of both walls of the upper stanchion sections 80 and the connecting post 84 inserted therewithin, proximate to the interface 86 between the upper stanchion section 80 and the lower stanchion section 82 as depicted in FIG. 10. The connecting posts 84 are thereby releasably secured within a second of the stanchion sections, which is the upper stanchion 80 in the embodiments illustrated. The preferred stanchion construction illustrated in FIG. 10 allows the rather lengthy stanchion to be disassembled into much shorter components to facilitate shipping and storage.

All of the embodiments of the invention are of metal construction which provides superior strength and exceptional durability. The base, the stanchions, the coupling gusset plates and the hooks are all formed of metal, although as previously noted, each hook includes a non-metallic protective coating thereon. The freestanding bicycle rack of the invention is suitable for both indoor and outdoor use and is far superior to wooden bicycle racks and mounting brackets which can only be used indoors and which will hold only limited styles or models of bicycles. Bicycles 20 can easily be placed on and removed from the bicycle rack of the invention. The freestanding bicycle rack of the invention is of simple construction and is unobtrusive in appearance.

Undoubtedly, numerous variations and modifications of the invention will become readily apparent to those familiar with bicycle racks. For example, shorter embodiments of the freestanding bicycle rack of the invention could be constructed to accommodate bicycles which employ detachable front wheels. Accordingly, the scope of the invention should not be construed as limited to the specific embodiments illustrated and described, but rather is defined in the claims appended hereto.

I claim:

1. A freestanding bicycle rack comprising: a base for resting on a supporting surface, a fair of stanchions mounted on said base and rising thereabove to a height greater than the longitudinal length of a bicycle, coupling means joining said stanchions together at their upper extremities, and hook means extending laterally outwardly from said stanchions and located above said base a distance greater than the longitudinal length of a bicycle to hold a bicycle placed thereon in suspension above said supporting surface and above the level of said base, wherein said stanchions rise from said base and converge toward each other in a vertical plane, and said hook means is comprised of a pair of hooks which extend laterally outwardly in opposite directions from said vertical plane.

2. A freestanding bicycle rack comprising a base, a pair of stanchions rigidly secured to said base and rising therefrom and converging toward each other to define a plane and extending to a height greater than the longitudinal length of a bicycle, coupling means rigidly securing said stanchions to each other at their upper extremities and hook means extending transversely outwardly between said stanchions at an elevation above said base greater than the longitudinal length of a bicycle and at an angle relative to said plane defined by said stanchions to engage a wheel of a bicycle and hold said bicycle suspended by said wheel above said base, one wheel above another, wherein said stanchions are rigidly connected to said base at locations laterally offset from the center of said base, and said plane defined by said stanchions is inclined upwardly and toward said center of said base and said hook means is comprised of a single hook located vertically above said center of said base.

3. A freestanding bicycle rack comprising a base, a pair of stanchions rigidly secured to said base and rising therefrom and converging toward each other to define a plane and extending to a height greater than the longitudinal length of a bicycle, coupling means rigidly securing said stanchions to each other at their upper extremities and hook means extending transversely outwardly between said stanchions at an elevation above said base greater than the longitudinal length of a bicycle and at an angle relative to said plane defined by said stanchions to engage a wheel of a bicycle and hold said bicycle suspended by said wheel above said base, one wheel above another, wherein said plane defined by said stanchions is a vertical plane passing through the center of said base, and said hook means is comprised of a pair of hooks extending outwardly in opposite directions from said vertical plane.

4. A freestanding bicycle rack comprising a base, a pair of stanchions rigidly secured to said abase and rising therefrom and converging toward each other to define a plane and extending to a height greater than the longitudinal length of a bicycle, coupling means rigidly securing said stanchions to each other at their upper extremities and hook means extending transversely outwardly between said stanchions at an elevation above said base greater than the longitudinal length of a bicycle and at an angle relative to said plane defined by said stanchions to engage a wheel of a bicycle and hold said bicycle suspended by said wheel above said base, one wheel above another, wherein said base is comprised of a pair of mutually parallel steel rails laterally spaced from each other and extending transversely relative to said plane defined by said stanchions, and said rails are joined together by laterally disposed connecting means, and further comprising U-shaped steel brackets on each of said rails and said connecting means is embraced on both its opposite ends within said brackets and secured thereto by releasable fasteners.

5. A freestanding bicycle rack for suspending a bicycle in a disposition rotated from its normal attitude of use so that one wheel is suspended vertically beneath the other comprising a base including laterally separated feet for placement on a mounting surface, a gantry secured to said base and rising thereabove to an apex located vertically above said base and between said feet, and hook means extending laterally outwardly from said gantry proximate to said apex and at an elevation above said base greater than the longitudinal length of a bicycle for holding at least one bicycle by one wheel thereof such that said bicycle is suspended from said hook means with the wheels thereof disposed one above another with the weight of said bicycle acting vertically above said base, wherein said gantry is comprised of a pair of stanchions that extend upwardly from said feet and converge toward each other and culminate in said apex, and said stanchions are joined together at said apex by gusset plate means.

6. A freestanding bicycle rack according to claim 5 wherein said feet are comprised of a pair of mutually parallel, horizontally disposed steel rails, said stanchions lie in a vertical plane perpendicular to such steel rails, and said hook means is comprised of a pair of hooks extending in opposite directions transversely outwardly from said gusset plate means to support a pair of bicycles on opposite sides of said vertical planes.

7. A freestanding bicycle rack according to claim 5 wherein said stanchions lie in a plane which is inclined upwardly from s id feet of said base and said hook means is comprised of a single hook extending laterally outwardly from said inclined plane on one side thereof.

* * * * *